United States Patent
Wesley et al.

(10) Patent No.: US 12,553,624 B2
(45) Date of Patent: Feb. 17, 2026

(54) AIR PURIFIER AND PASSIVE HUMIDITY MODULE

(71) Applicant: BISSELL Inc., Grand Rapids, MI (US)

(72) Inventors: Mitch Wesley, Grand Rapids, MI (US); Derek Smith, Grand Rapids, MI (US); Jason Pruiett, Grand Rapids, MI (US)

(73) Assignee: BISSELL Inc., Grand Rapids, MI (US)

( * ) Notice: Subject to any disclaimer, the term of this patent is extended or adjusted under 35 U.S.C. 154(b) by 328 days.

(21) Appl. No.: 18/219,427

(22) Filed: Jul. 7, 2023

(65) Prior Publication Data

US 2024/0019139 A1 Jan. 18, 2024

Related U.S. Application Data

(60) Provisional application No. 63/388,742, filed on Jul. 13, 2022.

(51) Int. Cl.
| | |
|---|---|
| *F24F 6/04* | (2006.01) |
| *B01D 46/00* | (2022.01) |
| *F24F 11/52* | (2018.01) |
| *F24F 6/00* | (2006.01) |
| *F24F 110/20* | (2018.01) |
| *F24F 140/00* | (2018.01) |

(52) U.S. Cl.
CPC .......... *F24F 6/043* (2013.01); *B01D 46/0027* (2013.01); *F24F 11/52* (2018.01); *F24F 2006/008* (2013.01); *F24F 2110/20* (2018.01); *F24F 2140/00* (2018.01)

(58) Field of Classification Search
CPC .............. B01D 46/00; F24F 11/52; F24F 6/04
See application file for complete search history.

(56) References Cited

U.S. PATENT DOCUMENTS 10,948,205 B2 * 3/2021 McGarva ................ F24F 13/20

OTHER PUBLICATIONS

Miro Pro 2-in-1 air purifier & humidifier, downloaded at https://www.afloia.com/products/miro-pro-2-in-1-air-purifier-humidifier and available at least as of May 18, 2022.

* cited by examiner

*Primary Examiner* — Sharon Pregler
(74) *Attorney, Agent, or Firm* — Warner Norcross + Judd LLP

(57) ABSTRACT

An air purifier and a passive humidity module for inside air. The air purifier includes a housing and an air purifier air outlet. The passive humidity module is disposed at least partially on the air purifier air outlet. The passive humidity module includes a housing assembly defining an air inlet and an air outlet, a water tank supported by the housing assembly, a wick filter reservoir fluidly coupled to the water tank, at least one gutter fluidly coupled to the water tank, and a wick filter disposed in the wick filter reservoir and supported by the housing assembly. The air inlet is at least partially aligned with the air purifier air outlet. The passive humidity module includes an airflow path flowing between the water tank and the wick filter, and fluidly connecting the air inlet and the air outlet.

8 Claims, 14 Drawing Sheets

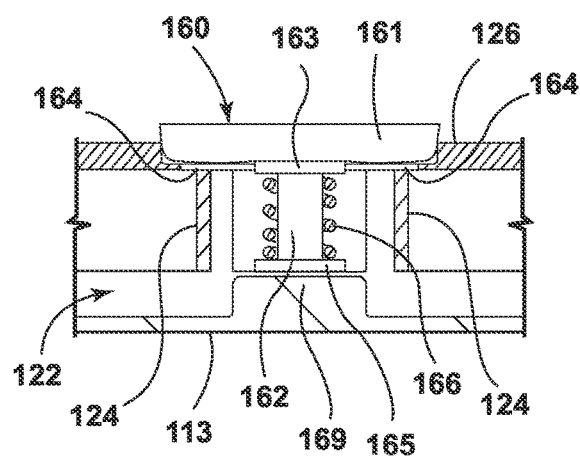 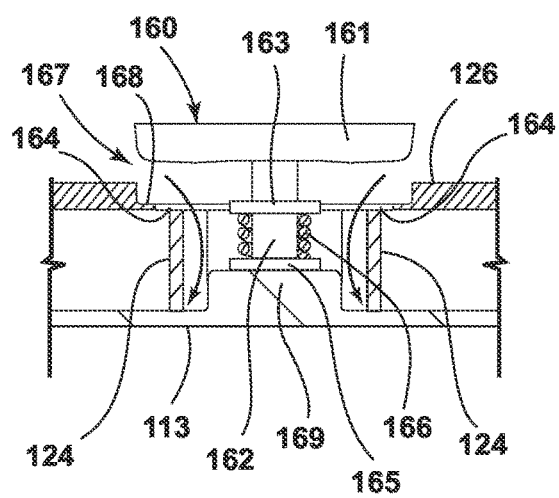
FIG. 7A   FIG. 7B

AIR PURIFIER AND PASSIVE HUMIDITY MODULE

BACKGROUND

Modern houses may use many systems to improve the air inside the house. Some exemplary systems include air purifying devices and air humidifiers. Air purifying devices filter particles from inside air and/or kill airborne pathogens. Air humidifiers increase the humidity of inside air. Each device takes up space within the home, which can be limited.

There is often a need to run both an air purifier and an air humidifier at the same time. Floor space and outlet placement can limit the ability of a consumer to do so. Additionally, there are times when the air humidifier is not needed but the air purifier is. For example, at certain times of the year the air has increased humidity naturally. Therefore, there is a need for a combined air purifier and air humidifier that can also be operated solely as an air purifier.

Air humidifiers for use with air purifiers are currently sold. However, these units tend to hold the water in the body of the humidifier, which is easily spilled when the humidifier is bumped, removed from, or installed on the air humidifier. Additionally, refilling these units often involves pouring water directly into the body of the humidifier, which increases the risk of spillage, for example spilling water into the air purifier. These air humidifiers can also restrict airflow out of the air purifier and thereby reduce the amount of clean air entering the room.

BRIEF DESCRIPTION

An air purifier and passive humidity module with improved ability to add humidity to inside air with low impact on the clean air delivery rate ("CADR") and performance of the unit is provided herein. Aspects of the disclosure relate to a passive humidity module with a housing assembly defining an air inlet and an air outlet, one or more gutters, a wick filter reservoir, a water tank, a wick filter, and an airflow path. The water tank can be supported by the housing assembly and configured to hold water. Both the gutters and the wick filter reservoir are fluidly connected to the water tank. The gutters are configured to transmit water from the water tank to the wick filter reservoir. The wick filter may be supported by the housing assembly and disposed within the wick filter reservoir. The wick filter is configured to absorb water from the wick filter reservoir. The airflow path includes air that flows between the water tank and the wick filter. The airflow path fluidly connects the air inlet and the air outlet. Air in the airflow path enters the passive humidity module through the air inlet. The air flows near the wick filter from which it picks up moisture, and then the air exits the passive humidity module through the air outlet.

In one embodiment, the passive humidity module includes an air deflector configured to direct the airflow path from the water tank to the air outlet.

Aspects of the disclosure relate to an air purification and passive humidification system. The system includes an air purifier and a passive humidity module. The air purifier includes an air purifier housing, an air purifier airflow path, and a blower disposed within the air purifier housing. The air purifier housing can define an air purifier air inlet and a top portion. The top portion may define an air purifier air outlet. The air purifier airflow path can fluidly connect the air purifier air inlet and the air purifier air outlet. The blower may be configured to draw air into the air purifier housing through the air purifier air inlet, along the air purifier airflow path, and push air out of the air purifier housing through the air purifier air outlet.

The passive humidity module can be configured to sit atop the top portion of the air purifier. The passive humidity module includes a housing assembly defining a humidifier air inlet and a humidifier air outlet, one or more gutters, a wick filter reservoir, a water tank, a wick filter, and a humidifier airflow path. The water tank may be supported by the housing assembly and configured to hold water. Both the gutters and the wick filter reservoir are fluidly connected to the water tank. The gutters can be configured to transmit water from the water tank to the wick filter reservoir. The wick filter may be supported by the housing assembly and disposed within the wick filter reservoir. The wick filter is configured to absorb water from the wick filter reservoir. The humidifier airflow path includes air that flows between the water tank and the wick filter. The humidifier airflow path fluidly connects the air purifier air outlet, the humidifier air inlet, and the humidifier air outlet. Purified air from the air purifier in the humidifier airflow path enters the passive humidity module through the air inlet. The air flows near the wick filter from which it picks up moisture and then exits the passive humidity module through the air outlet.

These and other features and advantages of the present disclosure will become apparent from the following description of particular embodiments, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

In the drawings:

FIG. 7A is a front partial sectional view along the line VII-VII of FIG. 4 of a water tank valve in a closed position according to one aspect;

FIG. 7B is a front partial sectional view of the water tank valve of FIG. 7A in an open position;

DETAILED DESCRIPTION

Figure 1:
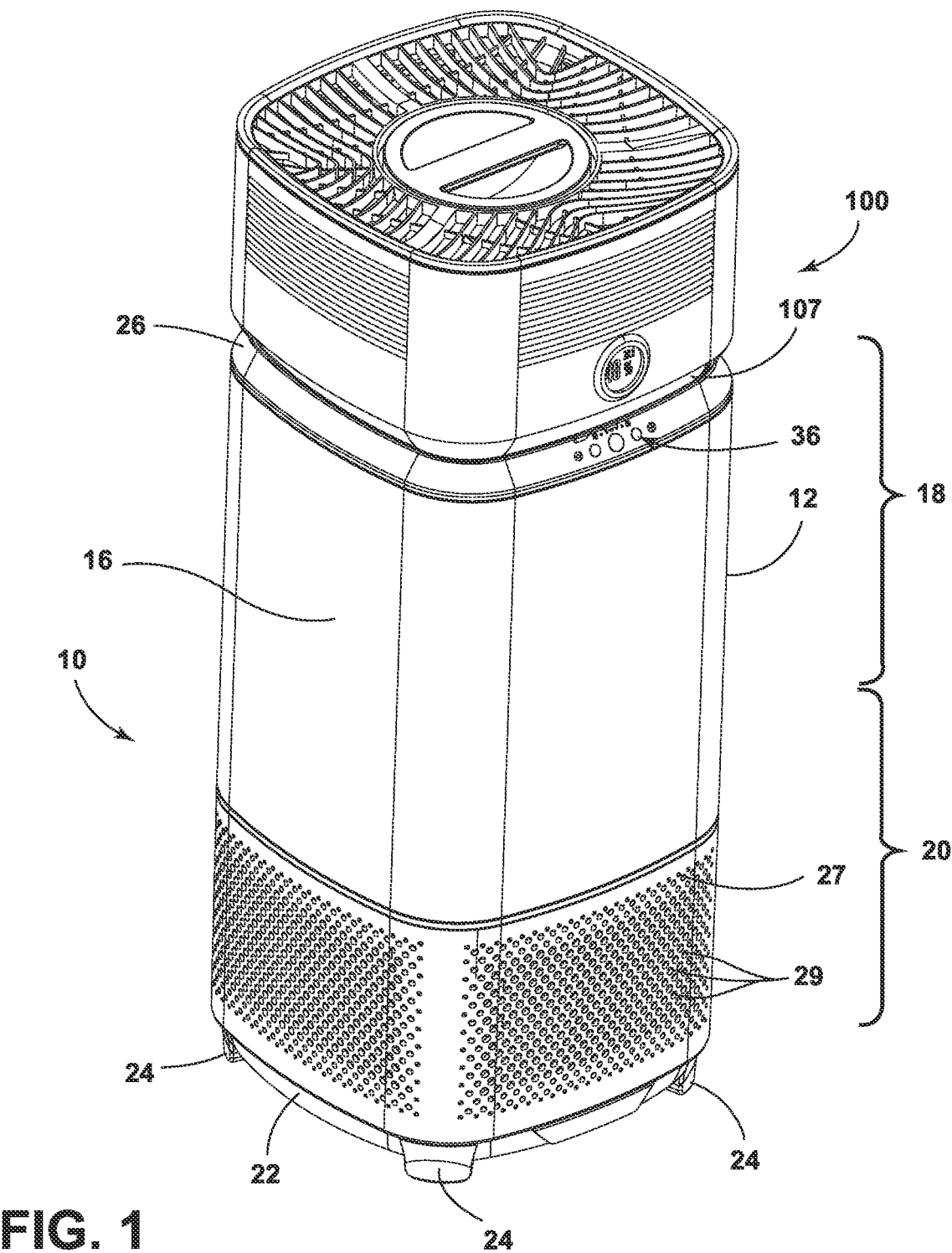
FIG. 1 is a perspective view of an air purifier with a passive humidity module according to various aspects described herein.

Aspects of the disclosure relate to an air purifier and a passive humidity module. The air purifier and passive humidity module have an improved ability to add humidity to inside air with minimal impact on the clean air delivery rate ("CADR") and performance of the unit. While primarily discussed herein in terms of an air purifier for indoor air, aspects of the passive humidity module and embodiments thereof disclosed herein are applicable to other types of air filtration apparatus.

The term "clean" as used herein is to describe the removal of pollutants from air as compared to the ambient air. Pollutants can include dirt, dust, volatile organic compounds (VOCs), biological contaminants (e.g., bacteria, viruses, mold spores, waste products, etc.), soot particles, and any other pollutants that can be found in indoor and/or outdoor flows.

The term "purify" is used herein to describe killing or inactivating biological contaminants, pathogens, or microorganisms in the ambient air. It is noted that the air purifier apparatus can have a variety of applications including commercial or home based application.

As used herein, the term "upstream" refers to a direction that is opposite the air flow direction, and the term "downstream" refers to a direction that is in the same direction as the air flow. Additionally, as used herein, the terms "radial" or "radially" refer to a direction away from a common center. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

FIG. 1 shows an air purifier 10 with a passive humidity module 100 according to one aspect. The air purifier 10 and the passive humidity module 100 are described in further detail below according to various aspects.

I. Air Purifier

Figure 2:
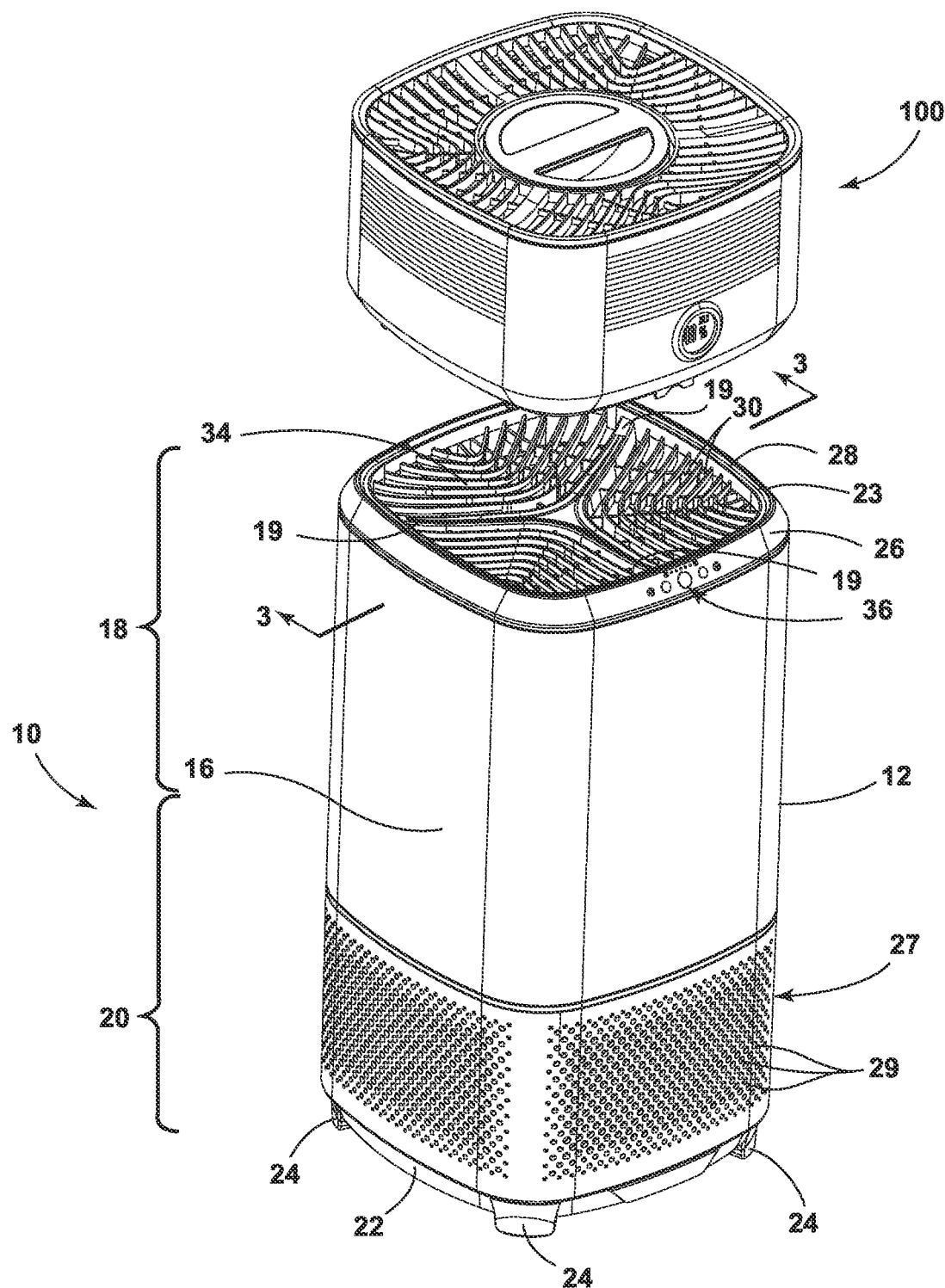
FIG. 2 is an exploded view of the air purifier and passive humidity module of FIG. 1.
Figure 3:
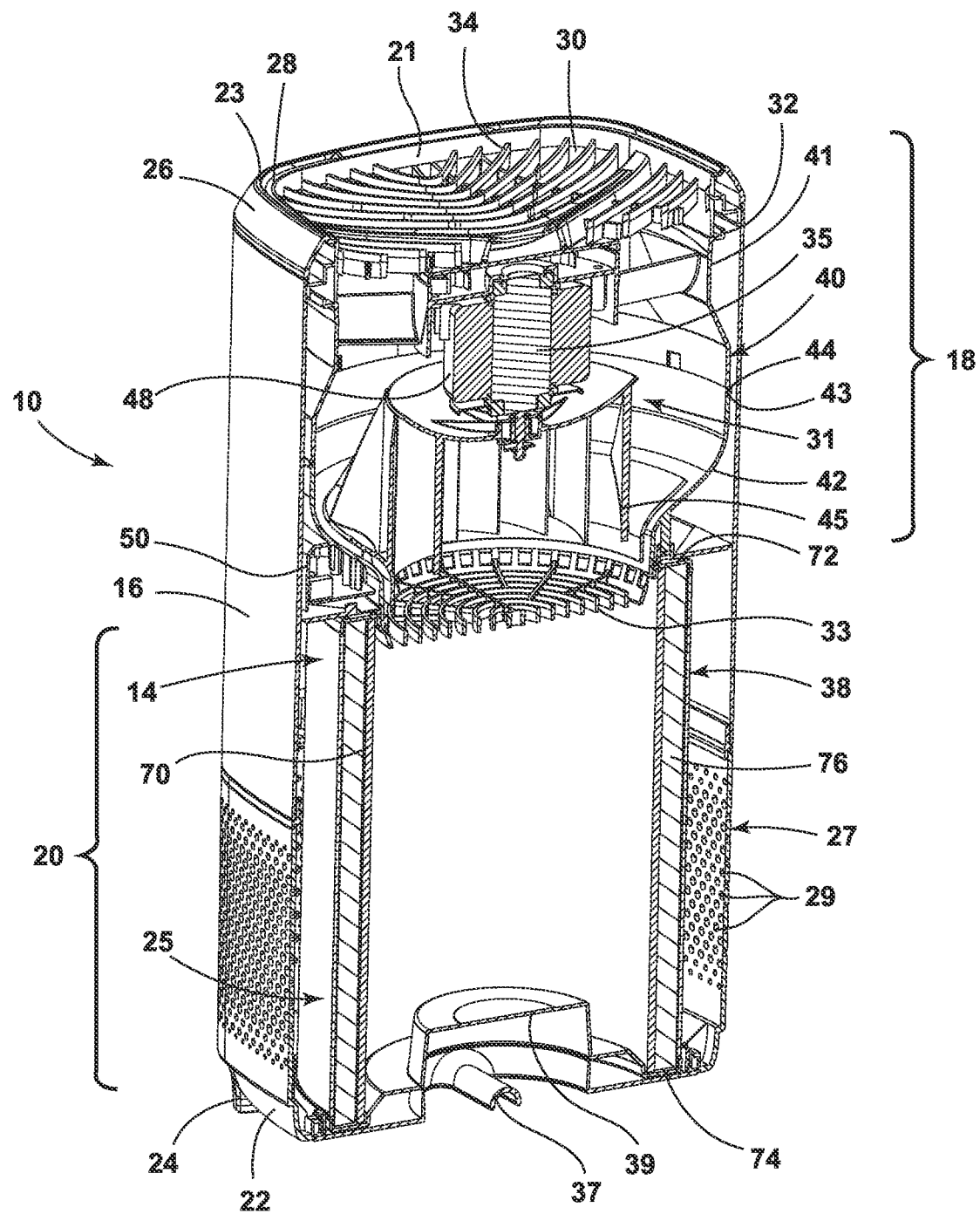
FIG. 3 is a sectional perspective view of the air purifier of FIG. 2 along the line 3-3.

FIGS. 1-3 illustrate an exemplary air purifier 10 in conjunction with one embodiment of the present disclosure. Referring to FIG. 1, a perspective view of the air purifier 10 is shown illustrating the general structure of the air purifier housing 12 along with externally viewable features and components.

The air purifier housing 12 can be a monolithic body, e.g., a single body that is a single, non-separable piece, or formed as a single unitary piece at manufacture, as opposed to being formed by combining separate elements into one during manufacture. Alternatively, the housing 12 can be defined by more than one component coupled together. The shape of the housing 12, as illustrated by way of example is a prism having a base or cross-sectional shape that is a squircle (e.g., a shape intermediate between a square and a circle), however it is contemplated that the housing 12 can be any shape, such as, but not limited to, a cylinder having a base or cross-sectional shape that is a circle, a round rectangular prism having a base or cross-sectional shape that is a rounded rectangle or a square, or an elliptic cylinder having a cross-sectional shape that is an ellipse or oval. The air purifier housing 12 can be manufactured from a variety of suitable materials, such as common plastic housing materials including acrylic, composite, polycarbonate, acrylonitrile butadiene styrene ("ABS"), high density polyethylene ("HDPE"), and polypropylene, to name a few suitable options. A decorative covering 16 may surround a portion of the housing 12.

To aid with description of the air purifier's components and features, the housing 12 is labeled with an upper portion 18 and a lower portion 20. Although the illustrated labels divide the housing roughly in half, it is contemplated that the upper portion 18 can be larger or smaller, with the lower portion 20 defining the remaining portion of the housing 12.

Referring to FIG. 2, a top portion 26 of the housing 12 is provided adjacent the upper portion 18. A lip or ledge 28 can define a perimeter of the top portion 26. As depicted, the ledge 28 is curved downward from a crest 23 of the ledge 28. The top portion 26 can surround the outside upper edge of the housing 12 to provide a clean aesthetic edge and surface for an air purifier user interface 36. In the current embodiment, the cover trim 26 is joined to the upper portion 18 of the housing 12 and an upper fan shroud top edge 32 (perhaps as best shown in FIG. 3).

The ledge 28 can be uniformly formed with the housing 12 or be a separate component of the housing 12. In the illustrated example, and by way of non-limiting example the top portion 26 has a similar shape to a cross-section of the housing 12. That is, the cover trim 26 is generally shaped as a squircle, although this need not be the case. That is, the housing 12 can have a cross-section similar in shape to the top portion 26, alternatively, the top portion 26 can have a different shape or be a different size than a cross-section of the housing 12.

An air purifier user interface 36, to the extent one is provided directly on the air purifier, can be mounted to or formed with the housing 12 or provided elsewhere on the air purifier 10. In the current embodiment, the user interface 36 for controlling operation of the air purifier is integrated into the external surface of the top portion 26.

The user interface 36 can include various features and user interface elements including, but not limited to, indicator lights providing information about the air purifier 10 to the user and/or buttons that adjust one or more settings or change the status of one or more components of the air purifier 10. While a single user interface 36 is shown, it is contemplated that the air purifier 10 can include more than one user interface. Optionally, the air purifier 10 can be remotely controlled by one or more electronic devices such as, but not limited to, a handheld remote or a mobile phone. The user interface 36 can include or be electrically coupled to a control system 50 located elsewhere in the air purifier 10.

The air purifier air outlet 30 can be provided in various locations and configurations on the housing 12. For example, the air purifier air outlet 30 can be provided toward the top end of the air purifier housing 12. In the current embodiment, the air purifier air outlet 30 is disposed within the internal perimeter of the cover trim 26 of the housing 12, and may be referred to as a vent. The vent can include a plurality of flow diverters 34, which define a plurality of openings (air purifier air outlets 30) therebetween. While illustrated generally as radially extending vanes, the flow diverters 34 can be uniform or dynamic in essentially any shape, size, number, profile, spacing, layering, and orientation to provide a desired venting profile and aesthetic appearance. The flow diverters 34 can be single piece components or assemblies defined by two or more flow diversion components. The vent may also include a plurality of support spokes 19 configured to provide structural stability to the vent. As depicted, the vent includes three support spokes 19. As depicted, the vent is concave, that is, it curves downward from the crest 23 of the ledge 28.

The lower portion 20 of the housing 12 generally includes an air purifier air inlet 27 and a base 22. The base 22 can include legs 24 or other supports. In the depicted embodiment, four legs 24 are disposed at the outer bottom corners of the base 22 to support the air purifier 10 in an upright standing position.

The air purifier air inlet 27 can be provided in various locations and configurations on the housing 12. By way of example, the air purifier air inlet 27 can include a plurality of perforations 29 in the lower portion 20 of the housing 12. The plurality of perforations 29 can be included on one or any number of sides of the housing 12. In the current embodiment all four sides of the housing 12 have a set of perforations 29 that each permit air to enter into the air treatment chamber 25 (See FIG. 3). The plurality of perforations 29 can be generally uniform or dynamic in size, number, and shape. In the depicted embodiment, the perforations 29 are organized into generally rectangular patterns on each side of the bottom portion 20 of the housing 12. Near the perimeter of the rectangular patterns on each housing face, the diameter of the perforations are smaller while near the center of the rectangular patterns the diameters of the perforations are larger.

Referring to FIG. 3, a sectional view of the air purifier 10 along the line 3-3 is shown illustrating internal components of the air purifier housing 12 as well as internal support structure of the housing 12, air purifier air inlet 27, and air purifier air outlet 30. In the depicted embodiment, the internal components of the air purifier generally include a control system 50, blower 31, and fan shroud 40 disposed in the upper portion 18 of the housing along with an inlet air treatment device 38 disposed within an air treatment chamber 25 in the lower portion 20 of the air purifier housing 12.

The control system 50 can be electrically coupled to the blower 31 as well as the user interface 36. The control system 50 can be configured to control operation of the fan motor 35 according to user input via the user interface 36. For example, the control system 50 can be configured to receive and respond to fan speed adjustment signals by communicating fan speed signals to the fan motor 35 to adjust fan speed. In one embodiment, there are five fan speed settings ranging from low to high. The fan speed may also include an automatic mode setting where the fan speed is dynamically and automatically controlled by the control system 50 according to indoor air quality readings, other sensor readings, or a predetermined fan speed profile.

Although the control system 50 is depicted disposed within the interior 14 of the upper portion 18 of the housing 12 adjacent the fan shroud 40, in alternative embodiments, the control system 50 can be disposed elsewhere within the air purifier 10 or distributed at multiple locations within the interior 14 of the air purifier. The control system 50 or portions thereof can include a printed circuit board ("PCB"), microcontroller, and one or more other electronic components. The control system 50 may be electrically powered by an electrical connection to a power outlet via an electrical cord. Alternatively, the control system 50 can be powered by a battery or other power supply circuitry.

The blower 31 can include a set of fan blades 45 coupled to a fan motor 35 to drive the fan blades 45 in order to generate airflow, which is channeled toward the air outlet 30 by the fan shroud 40. In general, while the fan motor 35 is energized, air is drawn through the air inlet 27, the air treatment chamber 25, the fan shroud 40, and pushed out of the air outlet 30.

The illustrated embodiment of the fan shroud 40 has a two-piece construction with a lower fan shroud 42 and an upper fan shroud 41. The top end of the lower fan shroud 42 includes a channel 43 that receives the lower edge 44 of the upper fan shroud 41 to form the complete fan shroud 40. In alternative embodiments the fan shroud 40 can have a monolithic construction, e.g., a single body that is a single, non-separable piece, or formed as a single unitary piece at manufacture, as opposed to being formed by combining separate elements into one during manufacture. The shape of the fan shroud 40, as illustrated by way of example is generally vase-shaped where the bottom surface of the airflow grill 33 of the lower shroud 42 is generally flat, the shroud body curves outward to facilitate airflow around the motor housing 48, then back inward to facilitate airflow through openings between flow diverters 34 of the upper fan shroud 41 and out the air outlet 30. In alternative embodiments, the fan shroud 40 can have a different shape that suitably facilitates airflow from the air treatment chamber 25 to the air outlet 30.

In the current embodiment, the blower 31 is disposed in the upper portion 18 of the housing 12, while the inlet air treatment device 38 is disposed in the lower portion 20 of the housing 12, generally below the blower 31. The blower 31 and the inlet air treatment device 38 are separated by the airflow grill 33 of the lower fan shroud 42. That is, in the current embodiment, the airflow grill 33 of the lower fan shroud 42 generally separates the inlet air treatment device 38 in the air treatment chamber 25 in the bottom portion 20 of the housing 12 from the fan shroud 40 and blower 31 in the upper portion 18 of the housing 12. In the current embodiment, the inlet air treatment device 38 is disposed within the airflow path upstream of the blower 31 such that air is drawn from the air inlet 27 through the air treatment device 38. However, other spatial arrangements are possible, for example where the blower 31 pushes air through the air treatment components, or a combination of pushing air through one or more air treatment components and drawing air through one or more other air treatment components.

A germicidal light source (not pictured) can be included within the air treatment chamber 25 of the air purifier 10 to assist with air treatment. In one embodiment, the germicidal light source is an ultraviolet (UV) light bulb, specifically a UV-C bulb that can aid with air treatment.

The inlet air treatment device 38 can include a cylindrical filter support 70, two filter support ends 72, 74, and air treatment media 76. The air treatment media 76 can have an accordion shape that wraps around the cylindrical filter support 70 and is held in place by the two filter support ends 72, 74. The inlet air treatment device 38 can be removably installable within the air treatment chamber 25 positioned adjacent the internal side of the air inlet 27. The air treatment media 76 can include essentially any suitable air treatment media or combination of air treatment media, including for example, a filter, an ion injector, or any combination thereof, and including multiples thereof. The air treatment media 76 of the inlet air treatment device 38 can be tailored such that the air purifier 10 as a whole provides satisfactory and suitable air treatment quality and efficiency. In the current embodiment, the air treatment media 76 can be a 3-in-1 filter including a pre-filter and combination of carbon and a high efficiency particulate air ("HEPA") filter. The pre-filter can be configured to capture large dust particles and hair, the carbon filter can be configured to absorb odors and VOCs, and the HEPA filter can be configured to capture pollen, pet dander, smoke, and fine dust particles. In other embodiments, instead of a 3-in-1 or other type of air treatment media, the inlet air treatment device 38 may include HEPA filter without a pre-filter or carbon filter.

The inlet air treatment device 38 can be selectively removable from the air purifier 10, for example by turning the air purifier 10 upside down, grabbing a removal handle 37, and twisting a removable cover 39 from a locked position to an unlocked position, and removing the bottom cover 39 to provide access through a bottom opening (not shown) of the base 22 to the air treatment chamber 25. The inlet air treatment device 38 can then be lifted out of the air purifier 10. In the current embodiment, the air treatment device 38 and the cover 39 are separate components, but in alternative embodiments the air treatment device 38 and cover 39 can be joined together or integrally formed such that twisting and removing the cover 39 also removes the air treatment device 38. The air treatment device 38 and cover 39 can be removably coupleable. In one embodiment, the cover 39 can be removed from a used inlet air treatment device 38 and re-coupled to a ready-to-use air treatment device 38.

General operation of the air purifier 10 will now be described in detail with respect to an airflow path through the air purifier 10. During operation, the blower 31 draws air through the air purifier 10. The airflow path through the housing 12 includes the air inlet 27 and the air outlet 30. In one embodiment, the airflow path is generally vertical through the housing 12.

II. Passive Humidity Module

The passive humidity module may alternately be referred to as a passive humidification module. As depicted in FIG. 1, the passive humidity module 100 can be disposed on the top portion 26 of the air purifier 10 covering the air outlet 30 such that air flowing out of the housing 12 passes through the passive humidity module 100. As depicted, the passive humidity module 100 does not limit access to the user interface 36. The relationship between the passive humidity module 100 and the air purifier 10 is described in more detail below. The passive humidity module 100 can be installed on and removed from the air purifier as the user's need for added humidity changes. The passive humidity module 100 described herein is an evaporative type humidifier. It will be noted by those having skill in the art that other types of humidifiers may be used. Some exemplary humidifier types include cool mist humidifiers, warm mist humidifiers, evaporative humidifiers, vaporizer humidifiers, and ultrasonic humidifiers.

Figure 4:
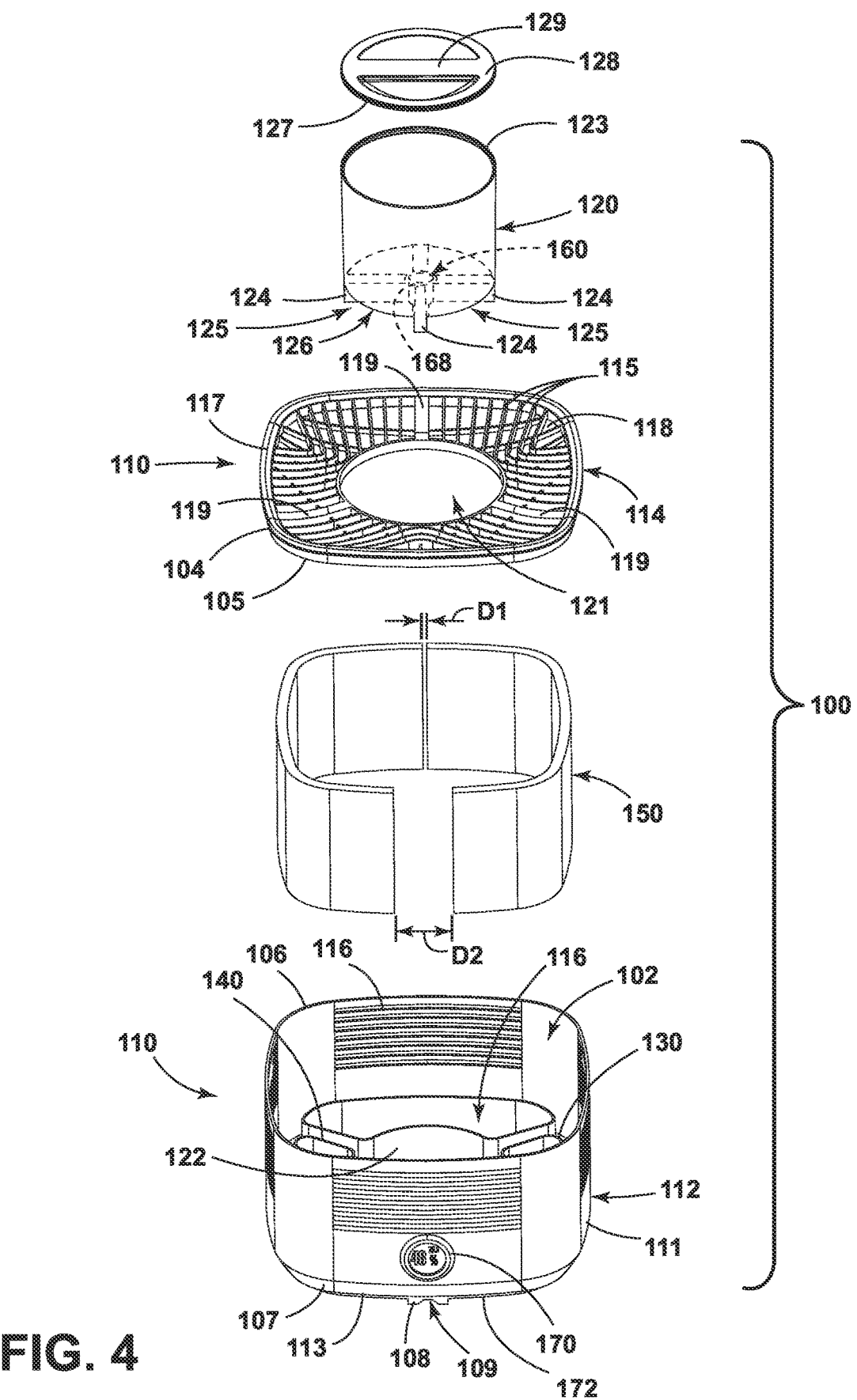
FIG. 4 is an exploded view of the passive humidity module of FIG. 1.

In FIG. 4, an exploded view of the passive humidity module 100 is shown. The passive humidity module 100 includes a housing assembly 110, a water tank 120 supported by the housing assembly 110, a wick filter reservoir 130, at least one gutter 140, and a wick filter 150. As depicted, the housing assembly 110 includes a lower housing 112 and a cover 114.

The housing assembly 110 can have a cross-section that generally conforms to the shape of the cross-section of the air purifier 10. As depicted, the housing assembly 110 has a cross-section that is a squircle, which generally conforms to the squircle cross-section of the air purifier 10. In another embodiment, the housing assembly 110 can have any other suitable shape and may have a cross-section that is different from the cross-section of the air purifier 10.

As depicted, the lower housing 112 is a prism with a cross-sectional shape that is a squircle. The lower housing 112 includes a base 113 and four sides 111 that extend upward from the base 113. The sides 111 terminate at an upper edge in a cover seat 106 and include a rounded portion 107 at a lower edge. In one embodiment, the rounded portion 107 is configured to match the curvature of the ledge 28 of the top portion 26 of the air purifier 10. The rounded portion 107 may be at least partially received in the top portion 26 of the air purifier 10 (FIG. 1), for example such that the rounded portion 107 is disposed inwardly of the lip or ledge 28. One or more humidity module legs 108 may extend from a bottom surface of the base 113, which facilitate interface with the air purifier. As depicted, the lower housing 112 includes three humidity module legs 108. The humidity module legs 108 can include a coupling channel 109. The coupling channel 109 can be referred to as an interface channel or alignment channel for disposing the passive humidity module upon the air purifier. In one embodiment, the coupling channel 109 may be sized and shaped to fit over one or more of the flow diverters 34 in the top portion 26 of the air purifier 10, thereby assisting in aligning the passive humidity module 100 on the air purifier 10. The rounded portion 107, the humidity module legs 108, and the coupling channel 109 contribute stability to the passive humidity module 100 that makes it resistive to bumping, etc. Other physical features for aligning the passive humidity module 100 on the air purifier 10 and increasing the stability of the passive humidity module 100 can also be included, such as additional humidity module legs.

Figure 5:
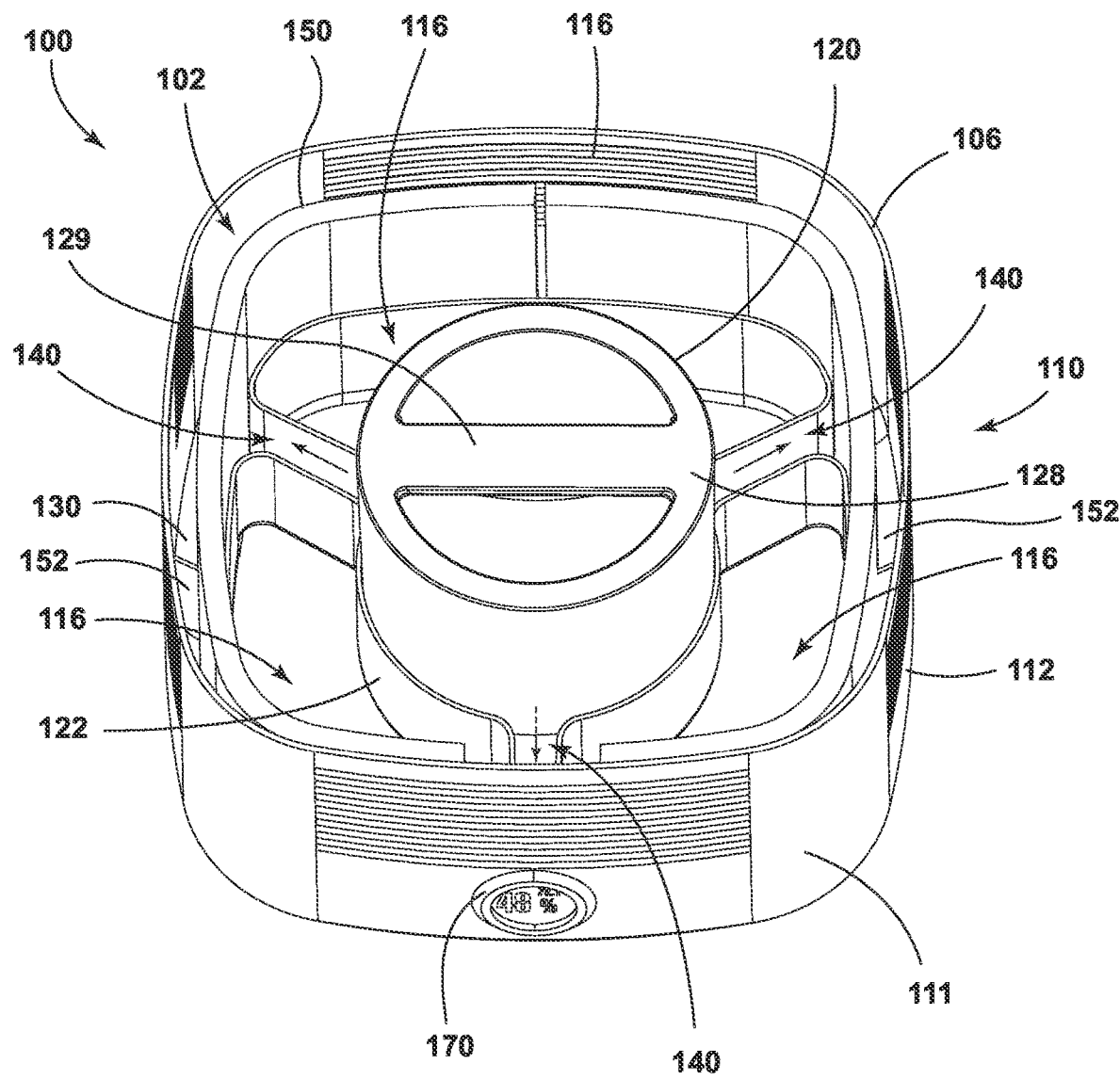
FIG. 5 is a top perspective view of the passive humidity module of FIG. 1.
Figure 6:
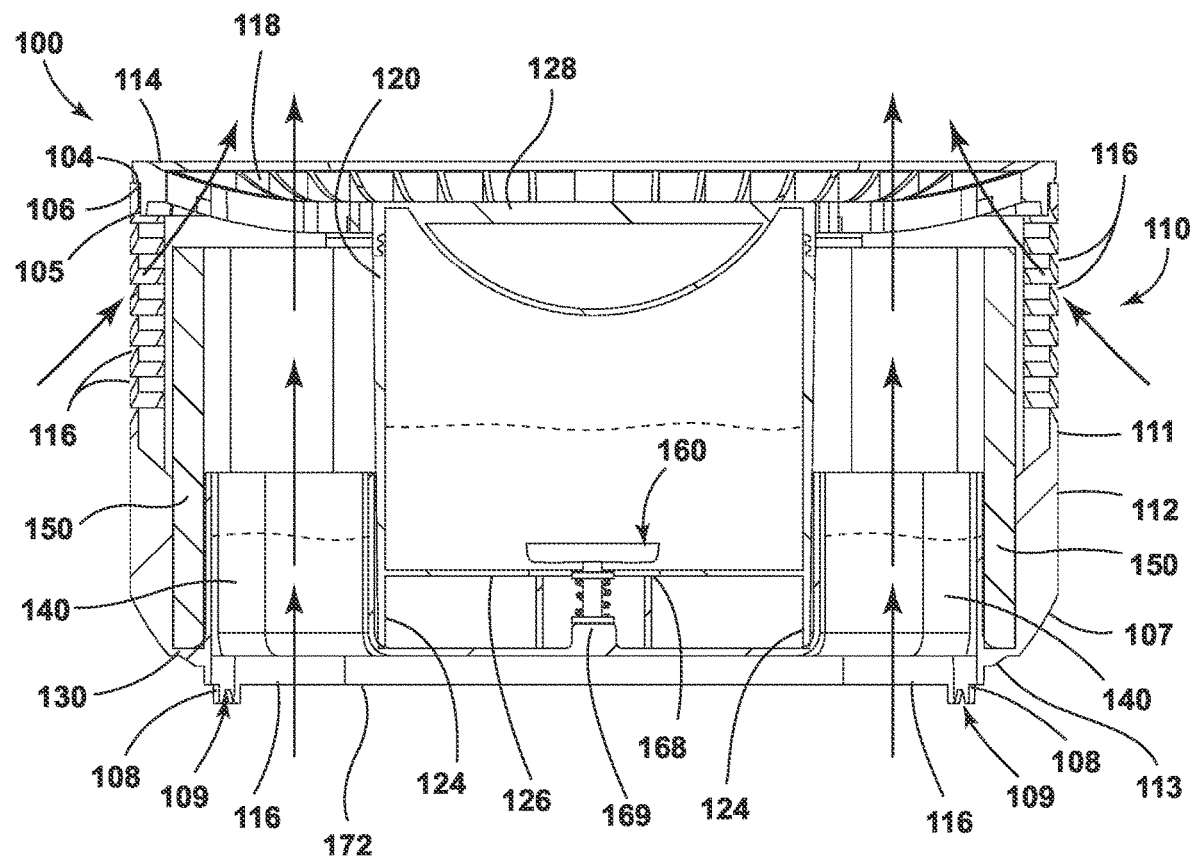
FIG. 6 is a representational air flow diagram of the passive humidity module of FIG. 1.
Figure 8:
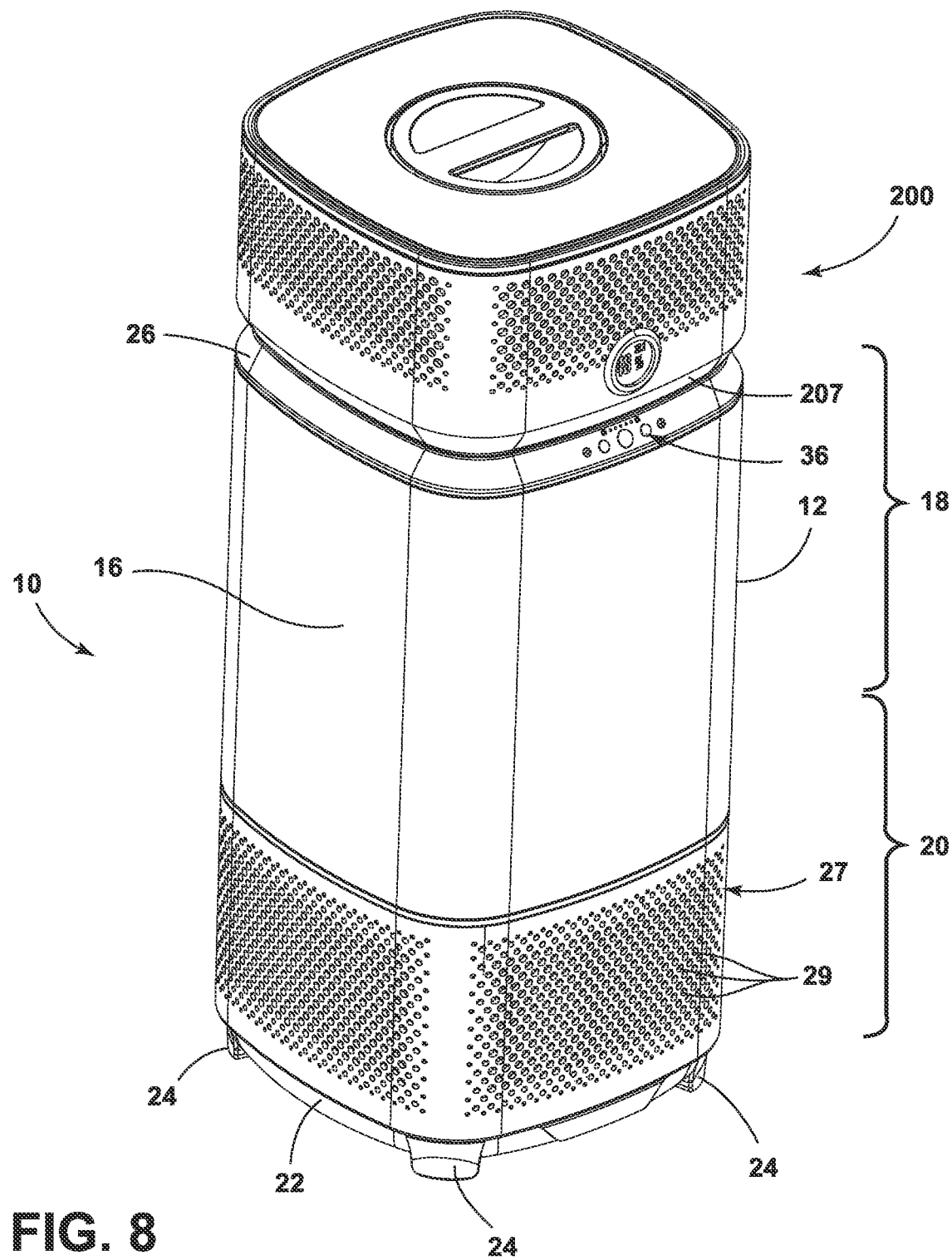
FIG. 8 is a perspective view of an air purifier with a passive humidity module according to one aspect.
Figure 9:
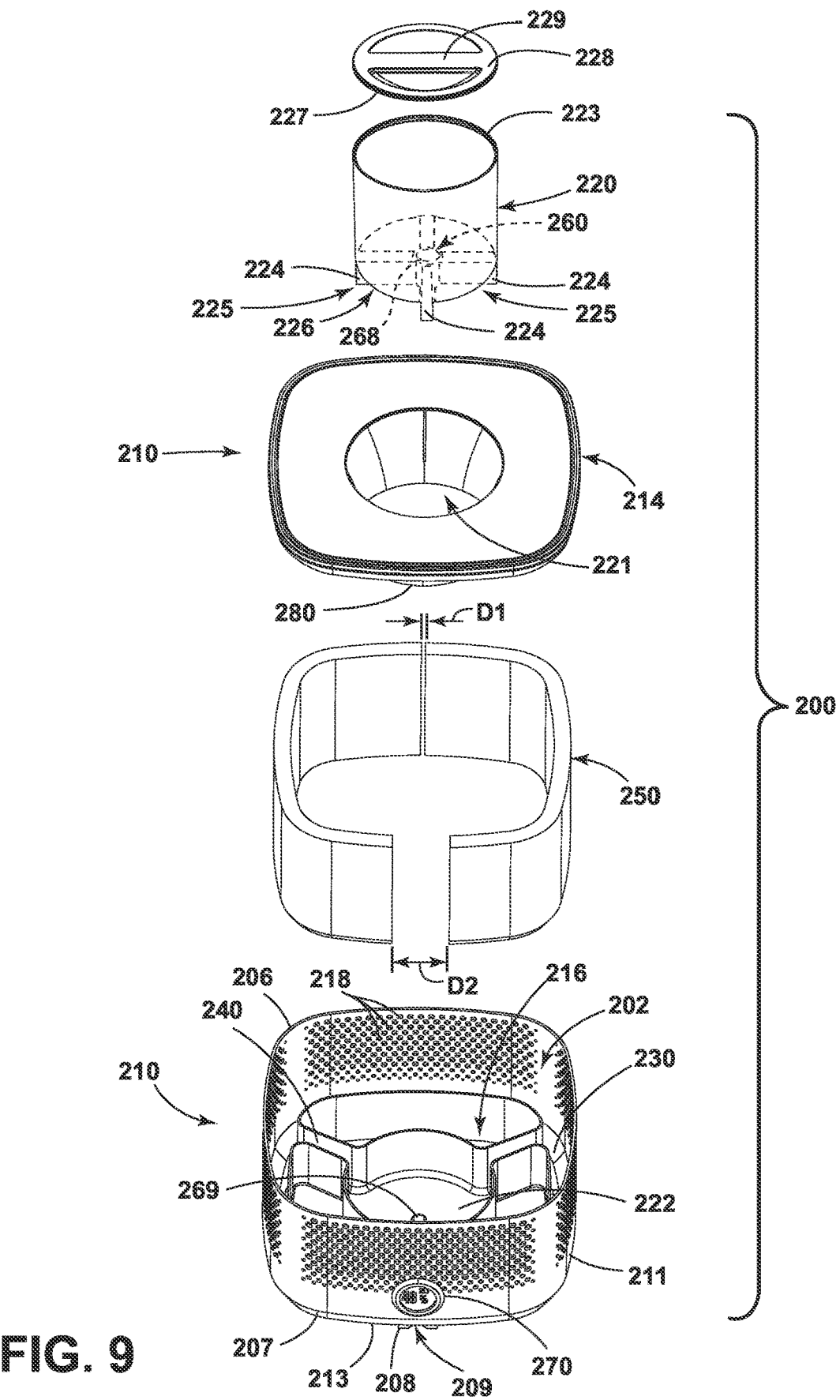
FIG. 9 is an exploded view of the passive humidity module of FIG. 8.
Figure 10:
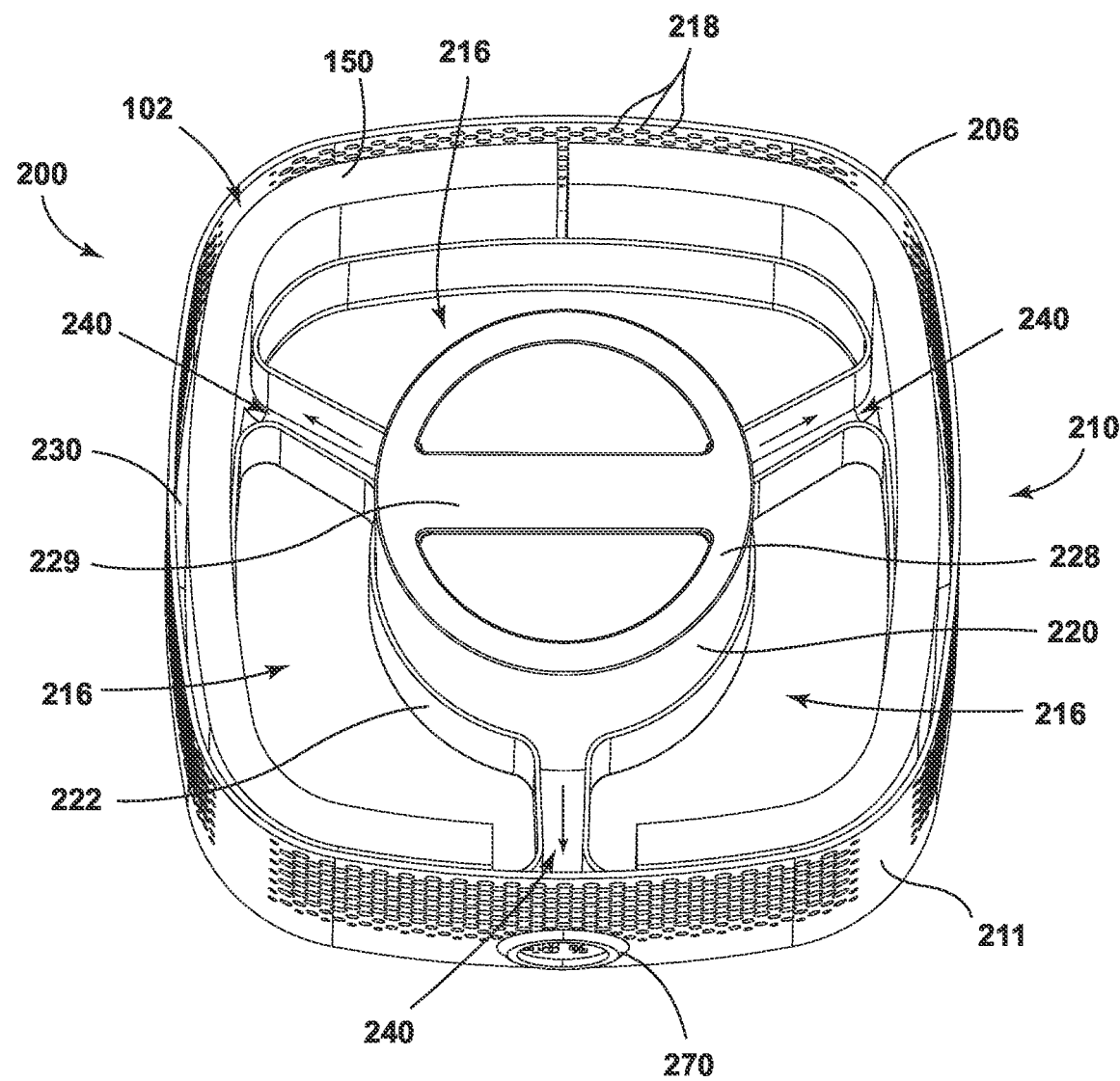
FIG. 10 is a top perspective view of the passive humidity module of FIG. 8 with a cover removed.

As shown in FIGS. 4 and 5, the base 113 of the passive humidity module can include a water tank seat 122. As depicted, the water tank seat 122 is formed from part of the base 113 in the center of the lower housing 112 horizontally. The water tank seat 122 can include a protrusion 169 in the center of the water tank seat 122 (perhaps as best shown in FIG. 6) for activating the water tank valve 160, as discussed in more detail below.

The housing assembly 110 of the passive humidity module 100 defines at least one air inlet 116 and at least one air outlet 118. The air inlets 116 allow air to enter an internal space 102 of the passive humidity module 100 (perhaps as best shown in FIG. 4) and be directed along an airflow path (perhaps best shown in FIG. 6) to the air outlets 118. As depicted, the lower housing 112 defines two types of air inlets (base air inlets 116 and side air inlets 116) and the cover 114 defines the air outlet 118. In another embodiment, the lower housing 112 may define both the air inlet 116 and the air outlet 118.

The lower housing 112 can define a plurality of air inlets 116 as openings in the base 113 of the lower housing 112. In one embodiment, the air inlets 116 in the base 113 may be configured to generally align with the air purifier air outlets 30 in the top portion 26 of the air purifier 10. Aligning the base humidifier air inlets 116 with the air purifier air outlets 30 can reduce airflow restriction between the air purifier 10 and the passive humidity module 100. Put another way, aligning the base humidifier air inlets 116 and the air purifier air outlets 30 lessens the impact on the CADR. Lessening the impact on the CADR also can increase the amount of humidity entering the room because the passive humidity module 100 is outputting more air into the room. The passive humidity module air inlets 116 can be configured to automatically align with the air purifier outlets by centering the passive humidity module on the top of the air purifier and disposing the coupling channels 109 of the humidity legs 108 on the flow diverters 34 in the top portion 26 of the air purifier 10. That is, the coupling between the coupling channel 109 in the humidity module legs 108 and the flow diverters 34 can help align the air purifier air outlet 30 and the base humidifier air inlets 116. For example, the humidity module legs 108 may be placed on the lower housing such that they couple to the support spokes 19 and the air purifier air outlets 30 are vertically aligned with the base humidifier air inlets 116.

The lower housing 112 may define a plurality of side air inlets 116 in one or more sides 111 of the lower housing 112. As depicted, the side air inlets 116 may be in the form of horizontal slits in the side 111 of the lower housing 112. As depicted, the side air inlets 116 are located on all four sides 111 of the lower housing 112. In an alternate embodiment, the side air inlets 116 can be on one or more sides 111 of the lower housing 112. In another embodiment, the lower housing 112 may not include the side air inlets 116. The side air inlets 116 can allow the fast moving air in the internal space 102 of the passive humidity module 100 to pull in stagnant air from outside the passive humidity module 100. This can increase airflow over the wick filter 150, which can increase evaporation. The side air inlets 116 create a second airflow path in the passive humidity module 100.

The passive humidity module cover 114 can include a plurality of outlet grill ribs 115 that define a plurality of air outlets 118 in between. As depicted, the outlet grill ribs 115 are arranged in a matching outlet grill that matches the pattern of the flow diverters 34 of the air purifier 10. The cover 114 can include a cover trim 117 that extends around a perimeter of the cover 114. At least one end of the outlet grill ribs 115 may be coupled to the cover trim 117. The cover 114 can define a water tank aperture 121. The water tank aperture 121 can be sized to surround the perimeter of the water tank 120. As depicted, the water tank aperture 121 is in the center of the cover 114 and the water tank aperture 121 is at a lower height than the cover trim 117. Put another way, the cover 114 is convex. In alternate embodiments, the water tank aperture 121 may be at a different location in the cover 114 and/or a different elevation with respect to the cover trim 117. In one embodiment, the cover 114 can include a sleeve defining the water tank aperture 121 to further support and align the water tank 120. In another embodiment, the cover 114 may not include the water tank aperture 121. For example, as shown and described below with reference to FIGS. 12-14. As depicted, some of the outlet grill ribs 115 can extend from the cover trim 117 to the water tank aperture 121.

The cover 114 may include one or more support spokes 119 extending from the cover trim 117 to the water tank aperture 121. The support spokes 119 can provide additional rigidity and strength to the cover 114. As depicted, the cover 114 includes three support spokes 119 dividing the outlet grill ribs 115 into three distinct portions of air outlets 118. Each of these portions is aligned with one of the air inlets 116 in the base 113 of the lower housing 112. The alignment provides increased airflow through the passive humidity module 100. As depicted, the outlet grill ribs 115 are arranged in cascading "v" shapes with the vertex pointing toward the water tank aperture 121. While illustrated generally as radially extending vanes, the outlet grill ribs 115 can be any shape, size, profile, spacing, or orientation. Further, the outlet grill ribs 115 can be defined by two or more pieces or components.

The cover 114 may couple to the lower housing 112 at the upper edge of the lower housing 112 (the cover seat 106). The coupling can be permanent or removable. The cover 114 may couple to the lower housing 112 in any suitable manner, for example, through a snap fit. As depicted, the cover 114 attaches to the lower housing 112 by a press fit or a friction fit. The cover 114 can include a lip 104 and a retention protrusion 105. The cover 114 may be pushed onto the lower housing 112 such that the lip 104 abuts the cover seat 106 and the retention protrusion 105 extends into the internal space 102. Optionally, the cover 114 may further include a seal (not shown) on the lip 104 to seal the connection between the lower housing 112 and the cover 114. The lower housing 112 and the cover 114 may be plastic components manufactured via molding or other suitable method, and may be snapped, screwed, or otherwise secured together. Other configurations for the lower housing 112 and the cover 114 are possible.

The base 113 and the sides 111 of the lower housing 112 can define the wick filter reservoir 130 around a perimeter of the lower housing 112. The wick filter reservoir 130 can assist in defining the base air inlets 116. As depicted, the wick filter reservoir 130 has a height less than the height of the lower housing 112. This decreases the amount of water at the perimeter of the lower housing 112 and thus decreases the risk of water spilling into the air purifier 10 when the air purifier 10 or the passive humidity module 100 is tipped or otherwise agitated. The wick filter reservoir 130 may be fluidly connected to the water tank 120.

The base 113 may define one or more gutters 140 extending from the water tank seat 122 to the wick filter reservoir 130. As perhaps best seen in FIG. 5, each gutter 140 in the depicted embodiment includes a channel extending from the water tank seat 122 to the wick filter reservoir 130. The gutters 140 may be aligned with the support spokes 19 in the top portion of the air purifier 10 when the passive humidity module 100 is coupled to the air purifier 10 to increase air flow from the air purifier through the passive humidity module. That is, the alignment between the gutters 140 and the support spokes 19 can lessen the passive humidity module's 100 impact on the CADR. In another embodiment, additional or fewer gutters can be provided. As depicted, the gutters 140 assist in defining three distinct air inlets 116 in the base 113. The gutters 140 may be fluidly coupled to the water tank 120 and the wick filter reservoir 130. The gutters 140 can be configured to permit transmission of water from the water tank 120 to the wick filter reservoir 130. The gutters 140 may also house water during operation.

The water tank 120 may also be referred to as a gravity fed water tank. The water tank 120 is generally configured to hold and dispense water to the passive humidity module wick filter reservoir 130. In general, distilled or demineralized water can be used within the passive humidity module 100. In other embodiments, any other suitable liquid may be held in the water tank 120 and used in the passive humidity module 100. The water tank 120 can include a selectively removable water tank cover 128 to prevent unwanted objects from entering the water tank 120 and to seal the top of the water tank 120 during operation. The water tank cover 128 may removably seal the water tank 120 and prevent atmospheric pressure from acting on the water in the water tank 120 while sealed, which is described in more detail below. As depicted, the water tank cover 128 may include a handle 129. In one embodiment, the handle 129 can assist a user in removing the water tank cover 128 in order to refill the water tank 120 or add a cleaning tablet to the water tank 120. Additionally, or alternatively, the handle 129 can assist a user in removing the water tank 120 from the passive humidity module 100 and the handle 129 may be used to remove the water tank cover 128 from the water tank 120 for refill, cleaning, maintenance, replacement, or any other suitable operation. Removing the water tank 120 from the passive humidity module 100 to refill it reduces the risk of water spilling into the air purifier 10. In FIG. 4, the water tank cover 128 is shown exploded from the water tank 120. The water tank cover 128 may include a threaded portion 127 configured to removably couple to a threaded portion 123 on the water tank 120. The water tank cover 128 may be twisted onto the water tank 120 to secure the water tank cover 128 to the water tank 120. The water tank cover 128 can be twisted off of the water tank 120 to remove the water tank cover 128 from the water tank 120. In other embodiments, the water tank cover 128 may be removably secured to the water tank 120 through any suitable means. In one embodiment, the water tank cover 128 can include a refill aperture through which the water tank 120 can be refilled. Additionally, the water tank cover 128 may include a plug to prevent debris from entering the refill aperture when the water tank 120 is not being refilled.

In one embodiment, the water tank 120 can be placed in and removed from the housing assembly 110 through the water tank aperture 121 in the cover 114. As depicted, at least a portion of the cover 138 may be flush with a terminating edge of the water tank aperture 121. In one embodiment, the water tank 120 may include an indicator (such as a light emitting diode ("LED")) that can be illuminated to alert a user that the water tank 120 needs to be refilled. In one embodiment, the water tank 120 can be made from a transparent or translucent material so that a user can easily see when the water tank 120 needs to be refilled.

As depicted, the water tank 120 couples to the lower housing 112 through the water tank seat 122. That is, the water tank 120 can be installed in the passive humidity module 100 by disposing the bottom end of the water tank 120 through the water tank aperture 121 in the cover and onto the water tank seat 122. In another embodiment, the water tank 120 can be supported by the housing assembly 110 in any other suitable manner. The water tank 120 can include one or more water tank legs 124 configured to support the water tank 120 and create space between a water tank base 126 and the water tank seat 122 for water flow to the gutters 140. As depicted, the water tank 120 includes four water tank legs 124 extending from the water tank base 126 and spaced equidistantly around the water tank base 126 (perhaps best shown by phantom lines in FIG. 4). As depicted, the water tank legs 124 are hollow rectangular prisms with an open end opposite the water tank base 126. In other embodiments, there may be any number of water tank legs 124, and the water tank legs 124 may be any suitable shape. A plurality of water flow openings 125 can be defined between the water tank legs 124. The water tank 120 may be placed in the water tank seat 122 such that the water tank legs 124 are misaligned with the gutters 140, thereby allowing unrestricted water flow from the water tank 120 to the gutters 140 through the water flow openings 125. The water tank legs 124 can be sized and shaped such that water flow from the tank 120 to the gutters is not significantly restricted by the positioning of the legs relative to the water flow openings 125. For example, the water tank legs 124 can have a width smaller than the width of the gutters 140 such that water can flow around the water tank legs 124 and into the gutters 140 regardless of the water tank leg 124 alignment relative to the gutters 140.

In the depicted embodiment, the water tank 120 is vertically aligned with the blower 31 of the air purifier 10 when the passive humidity module 100 is installed on the air purifier 10. This placement of the water tank 120 permits less restricted airflow from the air purifier 10 to the passive humidity module 100. Put another way, this placement of the water tank 120 has a lesser impact on the CADR because it is placed above a portion of the air purifier 10 that does not have airflow. The central placement of the water tank 120 facilitates water tank stability; for example, it makes the passive humidity module 100 more resistant to being tipped or otherwise agitated. Thus, it is less likely water will spill out of the water tank 120.

The base 126 of the water tank 120 may define a flow aperture 167 (perhaps as best shown in FIGS. 7A-7B). Water can flow from the water tank 120 to the water tank seat 122 through the flow aperture 167. More specifically, the water exits the water tank 120 and flows into the water tank seat 122 through the water flow openings 125 between the water tank legs 124. As depicted, the flow aperture 167 includes a valve seat 168 in the form of a ledge jutting into the flow aperture 167. As depicted, a stopper 163 is located in the center of the flow aperture 167 and is connected to the flow aperture 167 through at least two spokes 164. The stopper 163 can define a plunger aperture through which the plunger 162 is inserted.

The water tank 120 can include a water tank valve 160 in the water tank base 126 (perhaps as best shown in FIGS. 6-7B). The water tank valve 160 can be configured to selectively release water from the water tank 120 to the water tank seat 122. From there, the water may flow into the one or more gutters 140 to the wick filter reservoir 130. In the depicted embodiment of FIGS. 7A-7B, the water tank valve 160 is an umbrella valve. The water tank valve 160 includes a diaphragm 161, a plunger 162, a head 165, and a compressible material 166. The plunger 162 can be connected at one end to the diaphragm 161 and at another end to the head 165. As depicted, the plunger 162 is movably coupled to the stopper 163 through the plunger aperture. The compressible material 166 can surround the plunger 162 between the stopper 163 and the head 165. In the depicted embodiment, the compressible material 166 is a spring. The diaphragm 161 may be configured to sit on the valve seat 168 of the flow aperture 167. In one embodiment, the diaphragm 161 is made from an elastomeric material.

In FIG. 7A, the water tank valve 166 is depicted in a closed position as the water tank 120 is being installed, just before the legs engage the water tank seat and the plunger depresses. In this configuration, the diaphragm 161 is seated on the valve seat 168 and is preventing water from exiting the water tank 120. As the water tank 120 is lowered into the water tank seat 122, the head 165 of the plunger contacts the protrusion 169 in the water tank seat 122. This compresses the compressible material 166 and pushes the plunger 162 and the diaphragm 161 upward, thereby allowing water to flow out of the water tank 120. In FIG. 7B, the water tank 120 is fully installed in the water tank seat 122 and the water tank valve 166 is in the open position and allowing water to flow out of the water tank 120 into the water tank seat 122, as depicted by the arrows. As the water tank 120 is removed from the water tank seat 122, the compressible material 166 expands until the diaphragm 161 is seated on the valve seat 168 and the water tank valve 166 is in the closed position. The water tank valve 166 having a normally closed position prevents water from flowing out of the water tank 120 through the flow aperture 167 until the water tank 120 is installed in the lower housing 112, or at least in the process of being installed in the lower housing 112.

As the water tank valve 160 opens, a vacuum is created in the water tank 120 because the water tank cover 128 is sealing the opposite end of the water tank 120. This means there is essentially no atmospheric pressure acting on the water in the water tank 120. Water can flow out of the water tank 120 until the hydrostatic pressure of the water in the water tank 120 (due to the weight of the water) equalizes with the atmospheric pressure being acted on the water in the gutters 140 and the wick filter reservoir 130. This may be referred to as a passive humidity module water level equilibrium, or simply the equilibrium point. As water evaporates from the wick filter reservoir 130 and the gutters 140 and as water is absorbed by the wick filter 150, more water can be automatically dispenses from the water tank 120 to equalize the pressure inside of and outside of the water tank 120. FIG. 6 shows an exemplary water level in the water tank 120 and the gutters 140 in phantom lines when the water pressure is equalized. It should be noted that the water level in the water tank 120 and in the gutters 140 are not necessarily at the same height at the point of equilibrium. The height of the water in the gutters 140 and in the wick filter reservoir 130 at the point of equilibrium may be strategically configured to be roughly half the height of the gutters 140 and the wick filter reservoir 130. This can allow the passive humidity module 100 to be tipped a certain degree without water spilling out of the gutters 140 and the wick filter reservoir 130. In one embodiment, the passive humidity module 100 may be tipped up to about 15° from its vertical axis without spilling water. In one embodiment, the passive humidity module 100 can be tipped up to about 12° from its vertical axis without spilling water In one embodiment, the height of the water in the wick filter reservoir and the gutters 140 at the point of equilibrium may be lower or higher relative to the sidewalls of the wick filter reservoir 130 and the gutters 140.

The point of equilibrium can depend on various factors including the height of the flow aperture 167 (which, in turn, is set by the height of the water tank legs 124) and the atmospheric pressure around the passive humidity module 100. The point of equilibrium may also depend on other factors. The height of the water tank legs 124 can be configured to balance one or more of the following factors and provide a desired equilibrium point. In one embodiment, the height of the water tank legs 124 may be set to permit sufficient water into the wick filter reservoir 130 such that the wick filter 150 can wick water through substantially all of the wick filter (e.g., to the top of the wick filter 150). In one embodiment, the height of the water tank legs 124 can be configured to limit the amount of water in the gutters 140 and the wick filter reservoir 130 such that the side walls of the gutters 140 and the wick filter reservoir 130 may be lower while still preventing water spillage. In one embodiment, the height of the water legs 124 may be configured to limit the amount of water in the gutters 140 and the wick filter reservoir 130 such that the passive humidity module 100 can be tipped a certain amount from its vertical axis without spilling water. For example, the passive humidity module 100 may tip 12° from its vertical axis without spilling water.

The wick filter 150 can be supported by the housing assembly 110. As depicted, the wick filter 150 has a generally squircle shape (perhaps as best shown in FIG. 4). Put another way, the wick filter 150 has a shape that generally conforms to the shape of the lower housing 112. In alternate embodiments, the wick filter 150 may have any shape including a shape that does not conform to the shape of the lower housing 112. The depicted wick filter 150 includes two identical halves that are spaced apart a first distance D1 at the back of the passive humidity module 100 and a second distance D2 at the front of the passive humidity module 100. In one embodiment, splitting the wick filter 150 into two halves may make installation of the wick filter 150 easier than installing a single piece wick filter. In another embodiment, the wick filter 150 may be one piece or more than two pieces. In the depicted embodiment, the first distance D1 is smaller than the second distance D2. In alternate embodiments, the first distance D1 and the second distance D2 may be the same distance, or the second distance D2 may be smaller than the first distance D1.

The wick filter 150 is disposed within the wick filter reservoir 130 perhaps as best shown in FIG. 5. The wick filter 150 is configured to absorb water from the wick filter reservoir 130 until the wick filter 150 is saturated. This creates a larger surface area for water to evaporate from than the wick filter reservoir 130 on its own. The larger the wick filter 150, the larger the evaporation surface area. Therefore, having the wick filter reservoir 130 around the perimeter of the lower housing 112 and disposing the wick filter 150 in the wick filter reservoir 130 increases the evaporation surface area. The wick filter 150 can help to trap minerals and other impurities from the water in the wick filter reservoir 130 so that those impurities are not released into the air.

The airflow path is shown in the representational air flow diagram of FIG. 6. The air in the airflow path flows into the air inlets 116 in the base 113 of the lower housing 112 and out the air outlets 118 in the cover. Put another way, the air in the airflow path flows between the water tank 120 and the wick filter 150 from the base air inlets 116 to the air outlets 118. The air picks up the water evaporated from the wick filter 150 as it moves through the passive humidity module 100 such that the air exiting the air outlets 118 has a higher humidity than the air entering the air inlets 116. The depicted passive humidity module 100 also has a second airflow path from the air inlets 116 in the side 111 of the lower housing 112 to the air outlets 118. The air in the second airflow path picks up water evaporated from the wick filter 150 before it exits the passive humidity module 100 through the air outlets 118.

Optionally, the passive humidity module 100 may include a user interface 170. As depicted in FIG. 4, the user interface 170 is disposed on one side 111 of the lower housing 112. As depicted, the user interface 170 is a hygrometer. In one embodiment, the hygrometer may be battery powered. Additionally, or alternatively, the user interface 170 may include a thermometer. In another embodiment, the user interface 170 may be a display. In alternate embodiments, the user interface 170 may be able to accept inputs from a user, for example, to set a desired humidity level or to set an amount of time for the passive humidity module 100 to operate. In one embodiment, the user interface 170 can display the humidity level of the room the passive humidity module 100 is located in. Additionally, or alternatively, the user interface 170 can display the amount of water left in the water tank 120. In some embodiments, the user interface 170 may prompt the user for some action, for example, to refill the water tank 120 or to replace the wick filter 150.

The passive humidity module 100 can be removable, press fit, fastened, snap fit, or permanently affixed to the air purifier 10. In an embodiment where the passive humidity module 100 is permanently affixed to the air purifier 10, the passive humidity module 100 may be selectively operational so the user can choose whether they want the room to be humidified or they simply want the air purified by the air purifier 10.

The operation of the passive humidity module 100 with respect to the air purifier 10 will now be described. Clean air exits the top portion 26 of the air purifier 10 and enters the passive humidity module 100 through the base air inlets 116. The air is exposed to the wick filter 150 and moves parallel to the wick filter 150 to collect water. The air exits through the air outlets 118 in the cover 114. Air is pulled in through the side air inlets 116 through the force of the air flowing through the internal space 102 of the passive humidity module 100. This air passes through and/or next to the wick filter 150 to collect water and exits the passive humidity module 100 through the air outlets 118 in the cover 114.

The passive humidity module 100 can be cleaned easily. As depicted, the water tank 120 has a generally cylindrical shape that is easily cleaned. The passive humidity module 100 generally has large round edges that can easily be cleaned. The passive humidity module 100 has a small number of parts, which also makes the passive humidity module easy to clean.

FIGS. 8-11 depict a passive humidity module 200 according to another aspect of the disclosure. The air humidifier 200 has many of the same features as the passive humidity module 100 discussed with respect to the preceding figures except for the differences outlined below. In principle, the passive humidity module 200 also has a gravity fed water chamber, but unlike the passive humidity module 100, it has an air deflector 280 that provides an alternate forced airflow path. Like elements are referred to with the same reference numeral with a leading "2" instead of a leading "1."

The air outlets 218 can be provided in various locations and configurations on the lower housing 212. By way of example, the air outlets 218 can include a plurality of perforations on one or any number of sides 211 of the lower housing 212. In the current embodiment, all four sides 211 of the lower housing 212 have a set of perforations that each permit air to exit the internal space 202 (See FIG. 9). The plurality of perforations can be generally uniform or dynamic in size, number, and shape. In the depicted embodiment, the perforations are organized into generally rectangular patterns on each side of the lower housing 212. Near the perimeter of the rectangular patterns on each side 211 of the lower housing 212, the diameter of the perforations are smaller while near the center of the rectangular patterns the diameters of the perforations are larger.

The cover 214 may be made from a solid material that does not permit airflow. The cover 214 can include an air deflector 280 (perhaps best shown in FIG. 11). The air deflector 280 can help define the water tank aperture 221. The air deflector 280 may start at the water tank 220 and curve outward toward an inner surface of each side 211 of the lower housing 212. Put another way, the air deflector 280 may be trumpet shaped. The air deflector 280 is configured to direct the airflow path from the water tank 220 to the air outlet 218. Put another way, air flows into the internal space 202 between the water tank 220 and the wick filter 250 through the air inlets 216 and, rather than continue travelling vertically, the air is directed to the air outlets 218 by the air deflector 280. The air deflector 280 may direct the air through the wick filter 250. The air deflector 280 can allow for a higher airflow rate and humidification rate in the passive humidity module 200 than in the passive humidity module 100.

Figure 11:
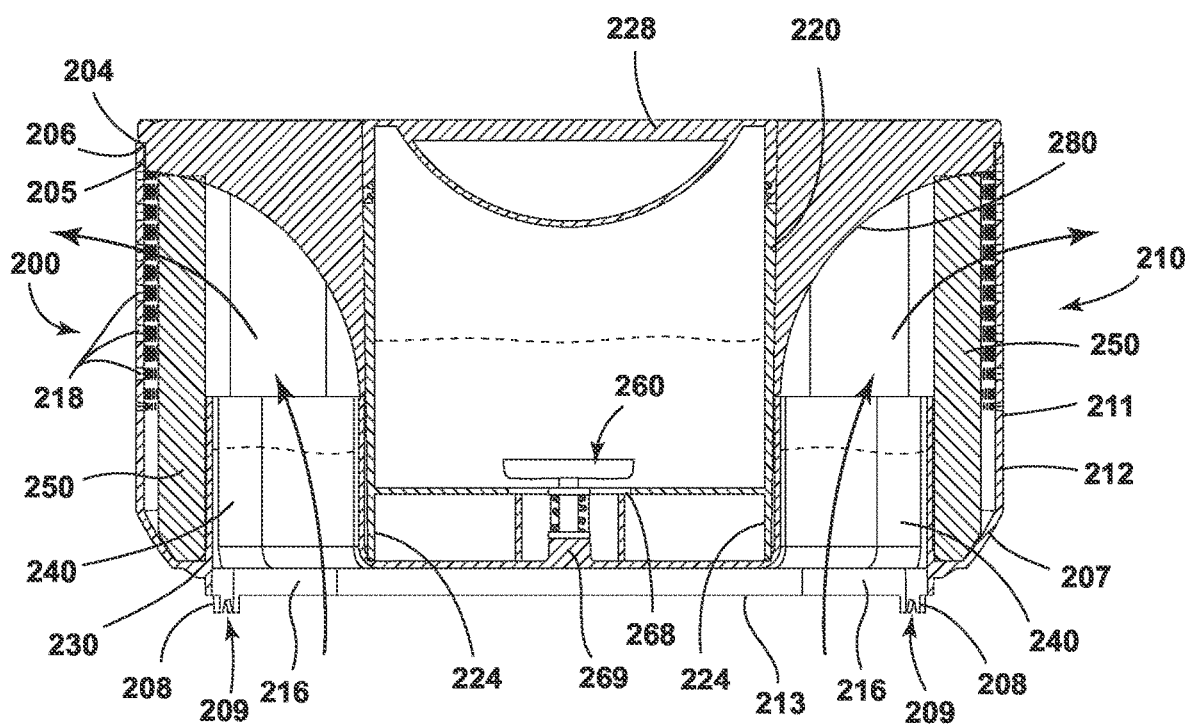
FIG. 11 is a representational air flow diagram of the passive humidity module of FIG. 8.

FIG. 11 shows a representational air flow diagram through the passive humidity module 200. The operation of the passive humidity module 200 with respect to the air purifier 10 will now be described. Clean air exits from the top portion 26 of the air purifier 10 and enters the passive humidity module 200 through the air inlets 216. The air deflector 280 redirects the air from its vertical path to a horizontal path. The air deflector 280 forces the air through the wick filter 250 and the air collects moisture. The air exits the wick filter 250 and exits the passive humidity module 200 through the air outlets 218 on the sides 211 of the lower housing 212.

Figure 12:
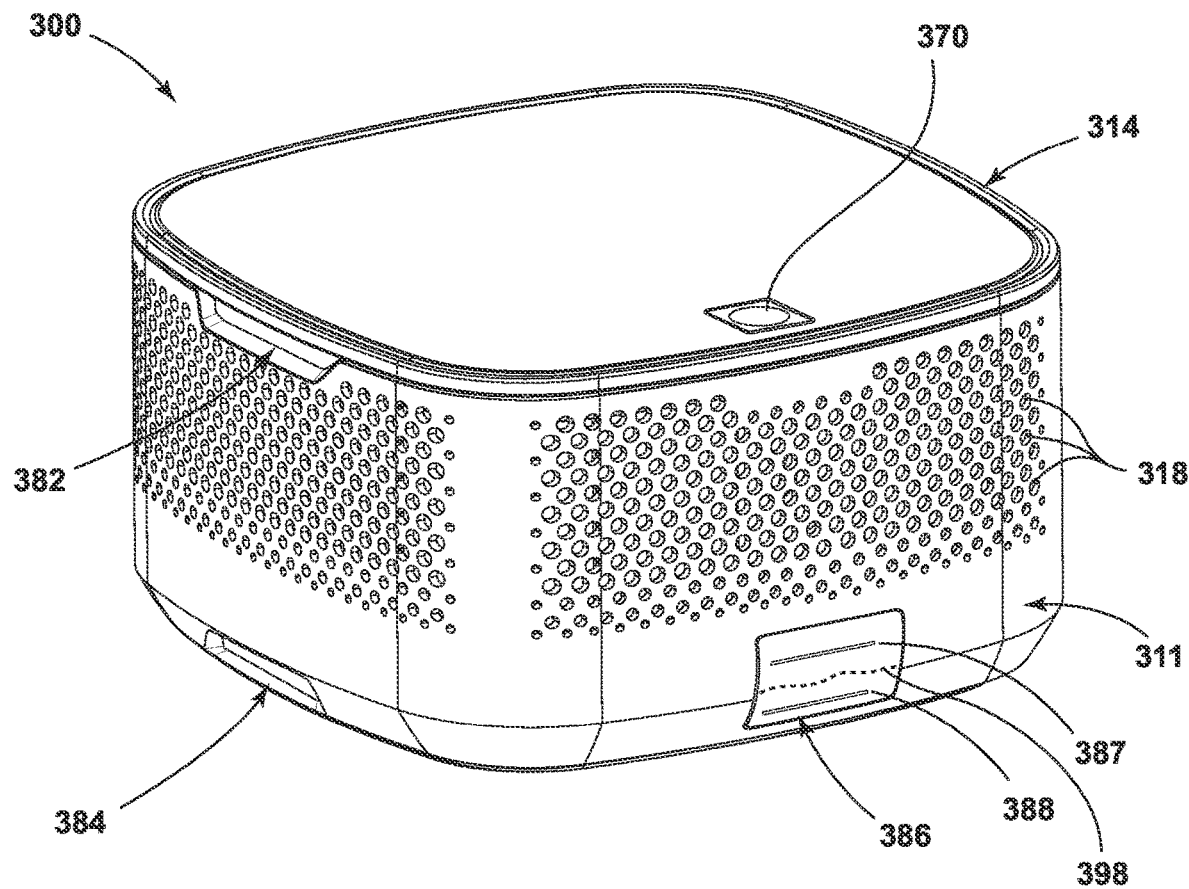
FIG. 12 is a perspective view of a passive humidity module according to one aspect.
Figure 13:
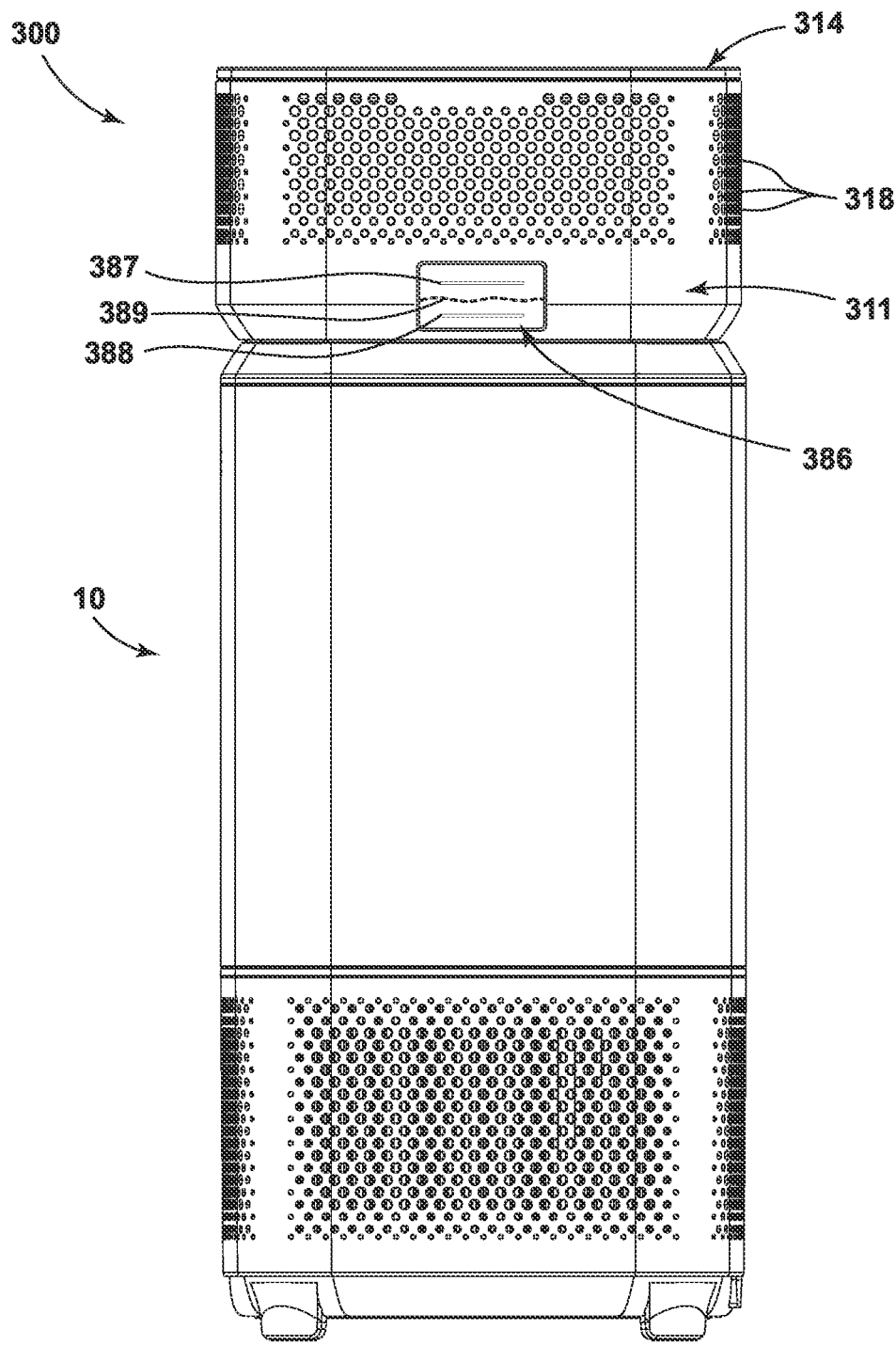
FIG. 13 is a front view of the passive humidity module of FIG. 12 installed on an air purifier.

FIG. 12 is a perspective view of a passive humidity module 300. The passive humidity module 300 is depicted as installed on an air purifier 10 in FIGS. 13-14. The passive humidity module 300 can include a cover 314 that provides a relatively smooth flat surface. A user can use the cover 314 as a table surface or table top, for example, to lay a drink upon. As depicted, the cover 314 includes a user interface 370 in the form of a battery powered hygrometer. Placing the hygrometer 370 in the cover 314 allows a user to quickly and easily view the hygrometer 370. In one embodiment, the hygrometer 370 may include a display that shows the humidity in the room and the temperature of the room. In one embodiment, the hygrometer 370 can be press fit into an opening in the cover 314 such that the hygrometer 370 is flush with the cover 314 in a seated position. The hygrometer 370 may be retained in the cover 314 by any suitable means. For example, the hygrometer 370 may include flexible knurled projections that secure the hygrometer 370 in place in the cover 314. The hygrometer 370 and the cover 314 can form a seal such that air is directed out the air outlets 318 rather than travelling through the cover 314.

In one embodiment, the cover 314 may act as a water tank cover and may seal the water tank at one end. In another embodiment, a separate water tank cover can be coupled to the water tank to seal the water tank at one end.

One or more cover handles 382 may be formed in a side 311 of the passive humidity module 300. The cover handles 382 can allow a user to grip the cover 314 and remove it from the passive humidity module 300. The cover handles 382 may create a space for the user's fingers as the cover 314 is placed on the passive humidity module 300.

Figure 14:
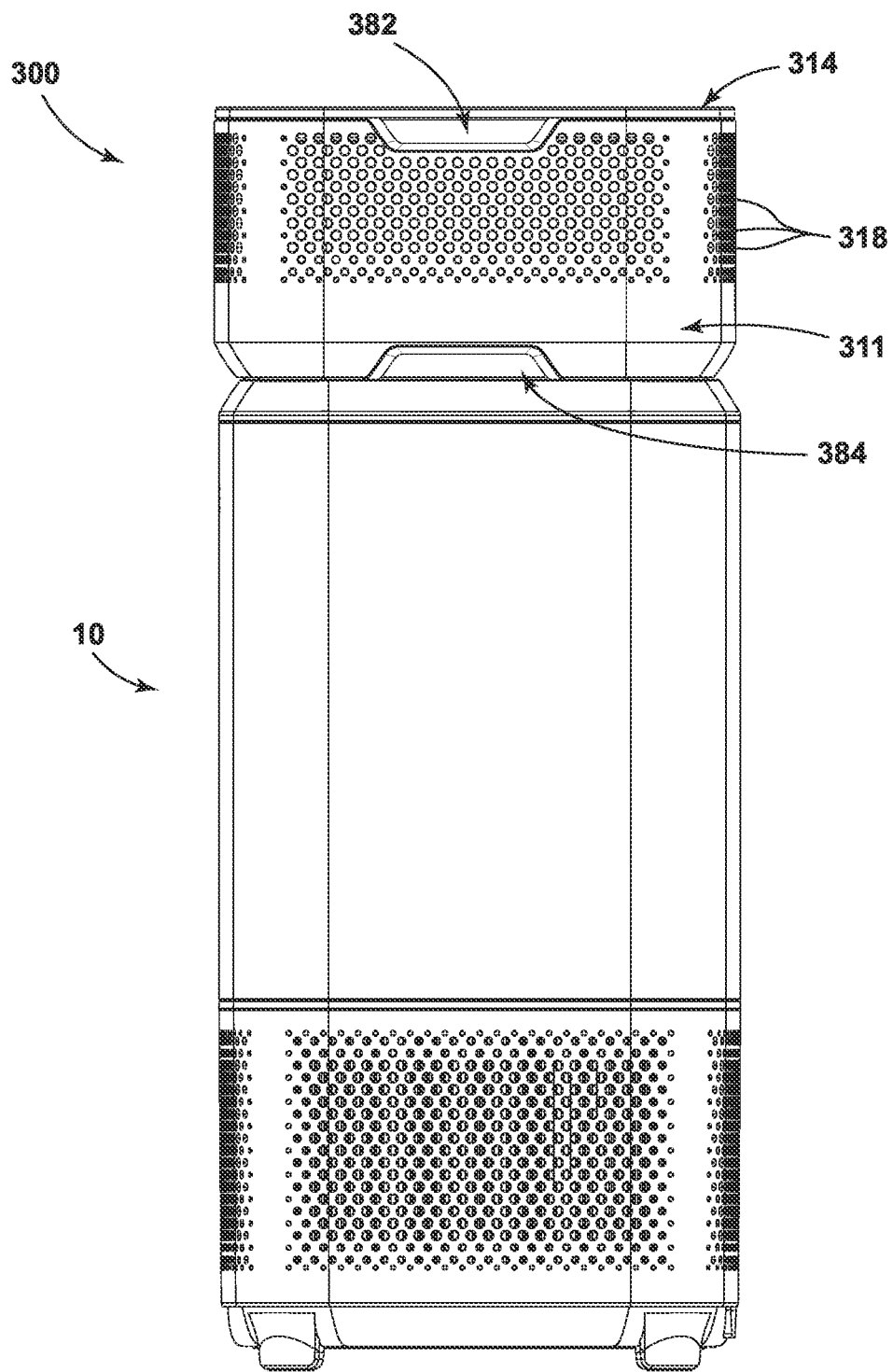
FIG. 14 is a side view of the passive humidity module of FIG. 12 installed on an air purifier.

One or more passive humidity module handles 384 can be formed in a side 311 of the passive humidity module 300 (perhaps as best shown in FIG. 14). The passive humidity module handles 384 can allow a user to grip the passive humidity module 300 and remove it from the air purifier 10. The passive humidity module handles 384 may allow the user to have more leverage when removing the passive humidity module 300 from the air purifier 10, which may make removal of the passive humidity module 300 from the air purifier 10 easier for the user. The passive humidity module handles 384 may create a space for the user's fingers as the passive humidity module 300 is placed on the air purifier 10.

The passive humidity module 300 can include a water level indicator 386 on one or more sides 311 of the passive humidity module 300. The water lever indicator 386 may show a user the water level 389 in the passive humidity module 300. In one embodiment, the water level indicator 386 may indicate to a user that the water level 389 in the passive humidity module 300 is too low or too high. As depicted, the water level indicator 386 is a window in the side 311 of the passive humidity module 300 that shows a user the water level 389 in the wick filter reservoir (not pictured). The window may be made of any suitable transparent or semi-transparent material. As depicted, the window includes a full marker 387 (indicating that the passive humidity module 300 is full of water) and a low marker 388 (indicating that the passive humidity module 300 is running low on water) below the full marker 387. The user can look at the water level indicator 386, see where the water level 389 in the wick filter reservoir is relative to the full marker 387 and the low marker 388, and take action accordingly. For example, if the water level 389 is at or below the low marker 388, the user may add more water to the passive humidity module 300. In one embodiment, the window may not include any markers. The user can look at the window, see where the water level 389 is relative to the window, and take action accordingly. In one embodiment, the height of the water tank legs 124 may be set to provide enough water depth in the wick filter reservoir such that the water level 389 can be readily viewable through the window of the water level indicator 386. The water level indicator 386 may be any other user interface that indicates the water level in the passive humidity module 300 to the user. In one embodiment, for example, the water level indicator 386 can be a light emitting diode ("LED") that illuminates when the water level in the passive humidity module 300 is low.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

What is claimed is:

1. An air purification and passive humidification system comprising:
an air purifier including:
an air purifier housing defining an air purifier air inlet and a top portion, the top portion defining an air purifier air outlet;
an air purifier airflow path fluidly connecting the air purifier air inlet and the air purifier air outlet; and
a blower disposed within the air purifier housing, the blower configured to draw air into the air purifier housing through the air purifier air inlet, along the air purifier airflow path, and push air out of the air purifier housing through the air purifier air outlet; and
a passive humidity module configured to sit atop the top portion of the air purifier, the passive humidity module including:
a humidification housing assembly defining a humidifier air inlet and a humidifier air outlet, the humidifier air inlet in fluid communication with the air purifier air outlet, the humidification housing assembly further comprising:
a lower humidification housing; and
a cover coupled to the lower humidification housing at an upper edge of the lower humidification housing, wherein the cover defines the humidifier air outlet of humidified air, wherein the cover forms a substantially horizontal and flat table top surface, and wherein the air purification and passive humidification system further comprises a press fit hygrometer coupled to the table top surface, the press fit hygrometer being flush with the table top surface;
a water tank supported by the humidification housing assembly, the water tank configured to hold water;
a wick filter reservoir fluidly coupled to the water tank;
at least one gutter fluidly coupled to the water tank, the at least one gutter configured to transmit water from the water tank to the wick filter reservoir;
a wick filter supported by the humidification housing assembly, the wick filter disposed within the wick filter reservoir, the wick filter configured to absorb water from the wick filter reservoir; and
a humidifier airflow path including air flowing between the water tank and the wick filter, the humidifier airflow path fluidly connecting the air purifier air outlet, the humidifier air inlet, and the humidifier air outlet.

2. The air purification and passive humidification system of claim 1, wherein the water tank is vertically aligned with the blower.

3. The air purification and passive humidification system of claim 1, wherein the humidifier air inlet is aligned with the air purifier air outlet.

4. The air purification and passive humidification system of claim 1, wherein the lower humidification housing defines the humidifier air outlet.

5. The air purification and passive humidification system of claim 4, the passive humidity module further comprising an air deflector coupled to the water tank, the air deflector configured to direct the humidifier airflow path from the water tank to the air outlet.

6. The air purification and passive humidification system of claim 1, the lower humidification housing further including a cover handle and a passive humidity module handle, the cover handle configured to provide a grip of the cover, and the passive humidity module handle configure to provide a grip of the passive humidity module.

7. The air purification and passive humidification system of claim 1, further comprising a water level indicator configured to indicate an amount of water in the passive humidity module.

8. The air purification and passive humidification system of claim 7, wherein the water level indicator includes an at least partially transparent window in a side of the housing assembly, whereby current water level in the wick filter reservoir is visible from an external vantage of the passive humidity module.

* * * * *